(12) United States Patent
Sciulli

(10) Patent No.: US 6,460,867 B2
(45) Date of Patent: *Oct. 8, 2002

(54) GOLF CART

(76) Inventor: Otto Sciulli, 4122 Stanley St., Pittsburgh, PA (US) 15207

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/524,367

(22) Filed: Mar. 14, 2000

(65) Prior Publication Data

US 2002/0125667 A1 Sep. 12, 2002

Related U.S. Application Data

(63) Continuation-in-part of application No. 09/499,480, filed on Feb. 7, 2000, now abandoned.

(51) Int. Cl.[7] .................................................. B62B 1/10
(52) U.S. Cl. .............................. 280/47.26; 280/DIG. 6
(58) Field of Search ............................ 280/47.17, 47.18, 280/47.2, 47.24, 47.26, 47.315, 47.33, 63, 79.2, DIG. 6; 301/125

(56) References Cited

U.S. PATENT DOCUMENTS

| | | | | |
|---|---|---|---|---|
| 2,599,928 A | * | 6/1952 | Lyons | 280/DIG. 6 |
| 2,629,609 A | * | 2/1953 | Wilson | 280/DIG. 6 |
| 3,304,036 A | * | 2/1967 | Davis | 280/DIG. 6 |
| 3,507,516 A | * | 4/1970 | Fritz | 301/125 |
| 3,733,086 A | * | 5/1973 | Walkerow | 280/47.17 |
| 4,062,564 A | * | 12/1977 | Schimmeyer | 280/DIG. 6 |
| 4,852,896 A | * | 8/1989 | Mills | 280/47.18 |
| 5,029,883 A | * | 7/1991 | Derito | 280/47.26 |
| 5,112,068 A | * | 5/1992 | Liao et al. | 280/47.26 |
| 5,244,219 A | * | 9/1993 | Hadlum | 280/47.26 |
| 5,683,097 A | * | 11/1997 | Fenton et al. | 280/47.26 |
| 5,803,472 A | * | 9/1998 | Lien | 280/47.26 |
| 6,068,271 A | * | 5/2000 | Lustica | 280/47.26 |
| 6,145,856 A | * | 11/2000 | Conti | 280/47.26 |
| 6,231,059 B1 | * | 5/2001 | Cheldin | 280/47.24 |

FOREIGN PATENT DOCUMENTS

CA 519351 * 12/1955 ............ 280/DIG. 6

* cited by examiner

Primary Examiner—Frank Vanaman
(74) Attorney, Agent, or Firm—Cohen & Grigsby, P.C.

(57) ABSTRACT

A golf bag (10) that includes a case (12) and a base (18) at the closed end thereof. A wheel and axle assembly (42) is detachably secured to a flexible clamp (20) that is mounted to the base (18). A handle (62) includes a shaft (66) that is detachably secured to a handle bracket (64) that is fastened to case (12) so that the golf bag can be pulled by the handle (62) while being supported by the wheel and axle assembly (42). A stand (100) is attached to case (12) at location that is opposite to that of handle bracket (64) so that golf bag (10) can be stood vertically in a stable position.

13 Claims, 4 Drawing Sheets

GOLF CART

CROSS-REFERENCE

This application is a continuation in part (CIP) of prior application Ser. No. 09/499,480 filed Feb. 7, 2000 now abandoned, the disclosure of which is incorporated herein by reference.

BACKGROUND OF THE INVENTION

1. Field of the Invention

The presently disclosed invention is directed to golf bags and, more particularly, golf bags that have removable wheels and handles such that the golf bags can be adapted for versatile use and also so that they can be more easily transported and stored.

2. Description of the Prior Art

Many types and styles of golf bags are known in the prior art. Some of these golf bags are intended to be carried manually or to be fastened to a pull cart or to a motorized golf cart. While pull carts can be rented at most golf courses, many golfers prefer to own their own pull cart. In that case, the pull cart must be transported to the golf course along with the other equipment. In cases where several golfers are traveling together or where a smaller vehicle is used, the additional bulk of the pull cart creates a shortage of storage space in the vehicle.

To overcome the difficulties normally associated with pull carts, some golf bags have been equipped with integral wheels and a handle. These bags avoid the need for the pull cart. To make storage of the bags easier and also to make the bags more versatile, some bags have wheels and a handle that are removable from the bag. An example is shown in U.S. Pat. No. 4,735,425. Such bags are advantageous in that they can be manually pulled or, alternatively, can be carried or fastened to a motorized golf cart.

One difficulty with such prior art golf bags is that they require a golf bag with a special internal spine to which the wheels and the handle are secured. Therefore, such removable wheels and handle cannot be used on new bags that do not have the necessary spine. Also, existing bags cannot be adapted to use the removable wheels and handle unless the existing bags also have the required spine. In addition, the removable wheels in such prior art devices are mechanically complex and therefore somewhat difficult to operate. Another difficulty has been that the design of these bags has been similar in many respects to the design of the separate pull carts so that the wheel assemblies require a substantial amount of storage or transportation space.

Accordingly, there was a need in the prior art for a golf bag that had detachable wheels and a detachable handle so that the golf bag could be more easily stored and transported, but also where the attachment mechanism was simple to use and the wheel assembly was more compact.

SUMMARY OF THE INVENTION

In accordance with the presently disclosed invention, a golf bag includes a case that has oppositely disposed ends with one of the ends being open to receive at least one golf club. The opposite end of the case is closed by a base. The base is composed of material that has sufficient rigidity and strength that it will provide rigid support for the golf clubs when the case is oriented vertically and the base is at the lower end. A flexible clamp is secured to the base. The flexible clamp has at least two c-shaped brackets that are aligned with respect to a common axis with each of the c-shaped brackets defining a gap between the ends of the c-shaped section. A wheel and axle assembly that is detachably connected to the flexible clamp includes wheels that are located at the opposite ends of an axle. The diameter of the axle is sized such that the axle can be received in and securely maintained by the c-shaped brackets. The diameter of the axle is greater than the respective gaps that are defined by the c-shaped brackets. The c-shaped brackets have sufficient elasticity and the axle is sized such that the c-shaped brackets are distorted by passing the axle through the gaps in the c-shaped brackets until the axle is received in the c-shaped brackets without exceeding the elastic limit of the c-shaped brackets. Therefore, the c-shaped brackets return to their unbiased position to maintain the axle in the c-shaped brackets of the flexible clamp.

Preferably, the axle of the wheel and axle assembly includes a spacer and the clamp includes two c-shaped brackets that are longitudinally spaced to fit on opposite sides of the spacer at times when the axle is received in the c-shaped brackets.

More preferably, the golf bag includes a handle bracket that is secured through the golf case to the spine of the golf bag and on the same side of the golf bag as the flexible clamp. The handle bracket is connected to a handle that includes a shaft and a grip. The handle is connected to the handle bucket by a detent means.

Most preferably, the golf bag further includes a stand that is secured to the golf case and located on the opposite side of the case from the handle bracket.

Other advantages and objects of the invention will become apparent to those skilled in the pertinent art as a detailed description of a presently preferred embodiment of the invention proceeds.

BRIEF DESCRIPTION OF THE DRAWINGS

A presently preferred embodiment of the disclosed invention is shown and described in connection with the accompanying drawings wherein.

DESCRIPTION OF A PREFERRED EMBODIMENT

Figure 1:
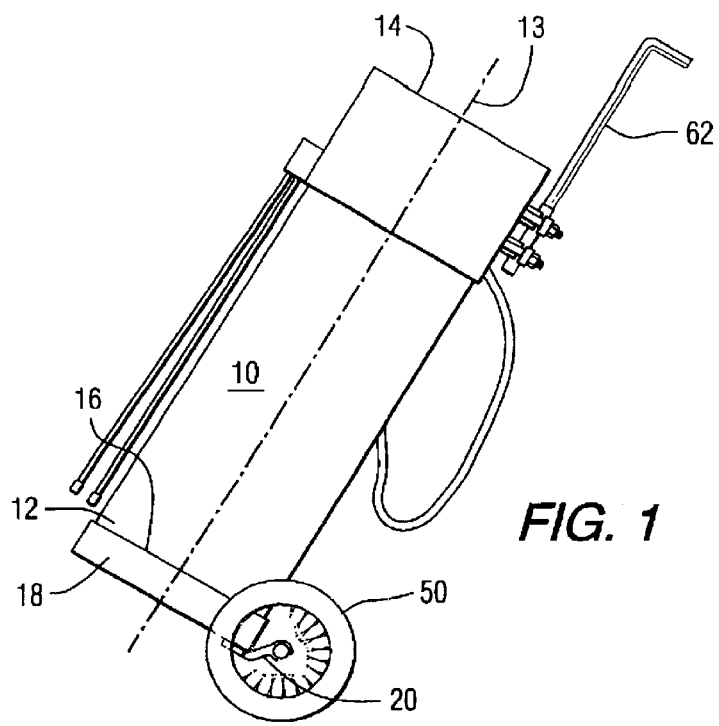
FIG. 1 is a side elevation view of the golf bag herein disclosed.

As shown in FIG. 1, the presently disclosed golf bag 10 includes a case 12 having a longitudinal center axis 13. Case 12 defines first and second oppositely disposed ends 14 and 16 respectively. The first end 14 of case 12 is open to receive golf clubs (not shown). The second end 16 of case 12 is secured to a base 18 that closes the second end 16 and provides a rigid vertical support for golf clubs that are in case 12 when case 12 is oriented such that the open end 14 is in the upward direction such as shown in FIG. 1.

As more particularly shown in FIGS. 1A and 2–4, the golf bag herein disclosed includes a flexible clamp 20 that is secured to base 18 with screws or equivalent fastening means. Flexible clamp 20 has two c-shaped brackets 22 and 24 that are connected to a bridge section 26. C-shaped brackets 22 and 24 define respective substantially cylindrical-shaped openings 22a and 24a that are aligned along a common longitudinal axis 28. Cylindrical-shaped openings 22a and 24a have substantially equivalent cross-sectional inside diameters 22b and 24b respectively.

In addition, each of the c-shaped brackets 22 and 24 define a gap 30 and 32 respectively. C-shaped bracket 22 defines gap 30 between distal ends 34 and 36 of bracket 22. C-shaped bracket 24 defines gap 32 between distal ends 38 and 40 of bracket 24. Brackets 22 and 24 are comprised of flexible plastic or other material that has sufficient elasticity to allow the end pairs 34, 36 and 38,40 to be mechanically biased apart to increase the width of gaps 30 and 32. The material of brackets 22 and 24 is also sufficiently resilient to allow the end pairs 34, 36 and 38,40 to return to their unbiased position when the bias force is removed.

Figure 1A:
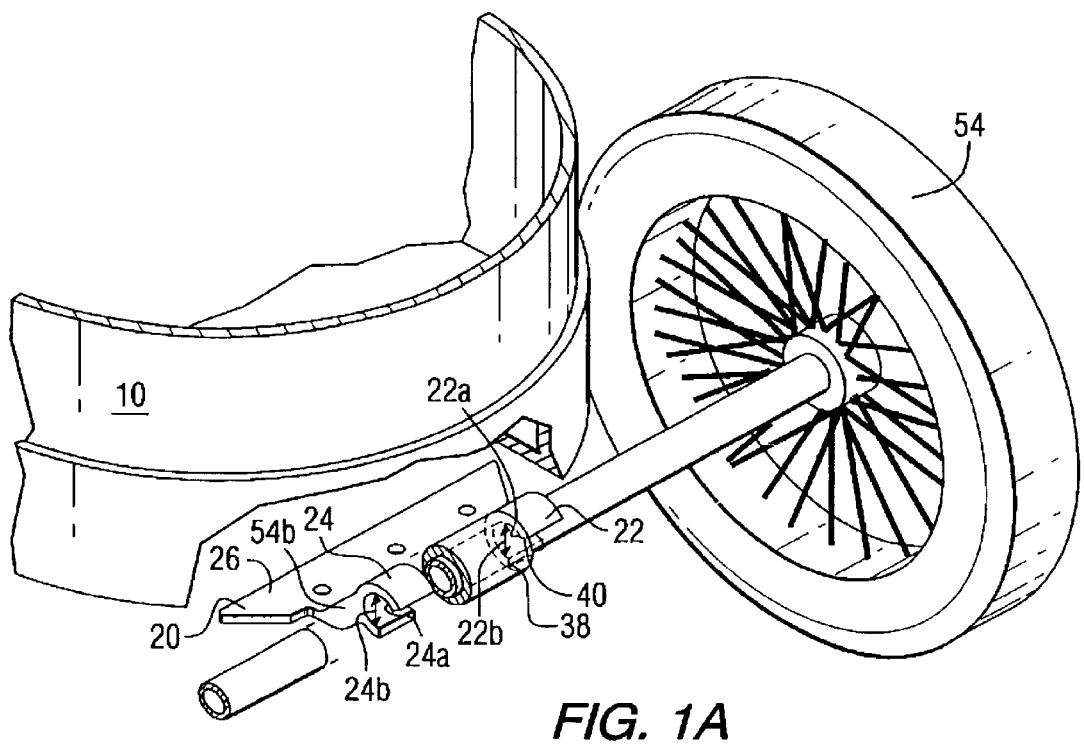
FIG. 1A is a perspective view of a part of the golf bag of FIG. 1 with portions thereof broken away to better disclose the flexible clamp and the wheel and axle assembly as herein further described.
Figure 2:
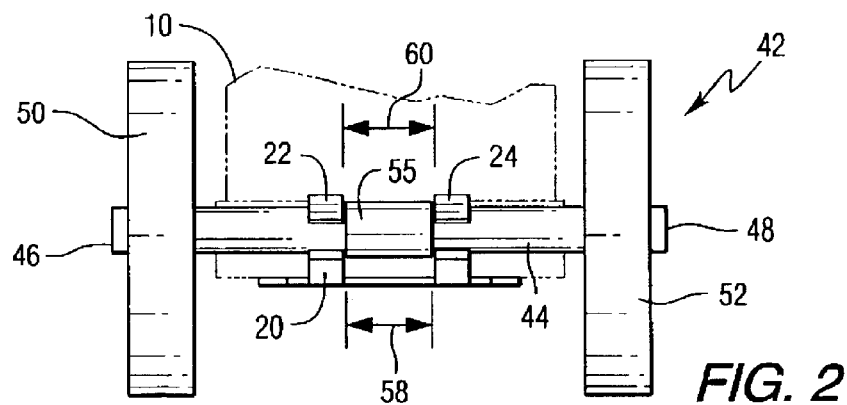
FIG. 2 is a front elevation of the portion of the golf bag shown in FIG. 1 that comprises the flexible clamp and the wheel and axle assembly as herein further described.
Figure 3:
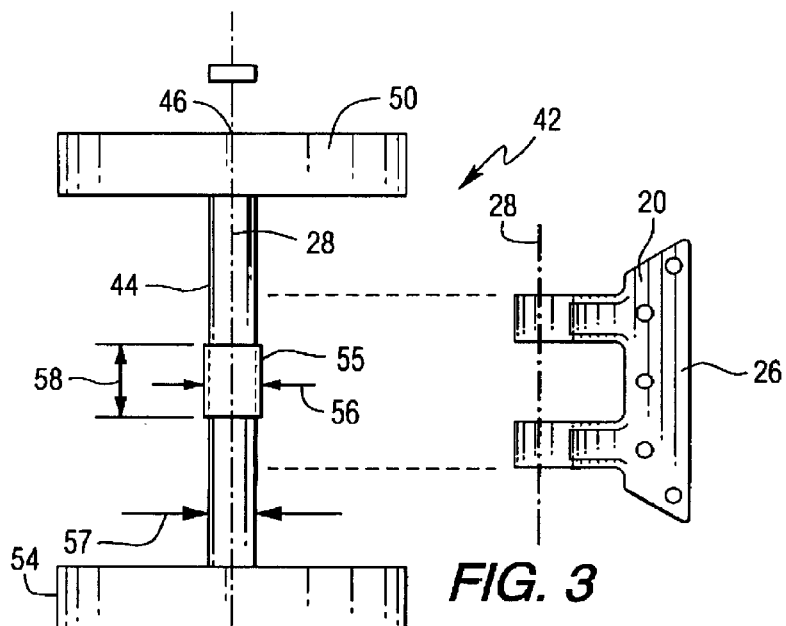
FIG. 3 is a plan view of the components shown in FIG. 2 with the wheel and axle assembly shown disassembled from the flexible clamp.
Figure 4:
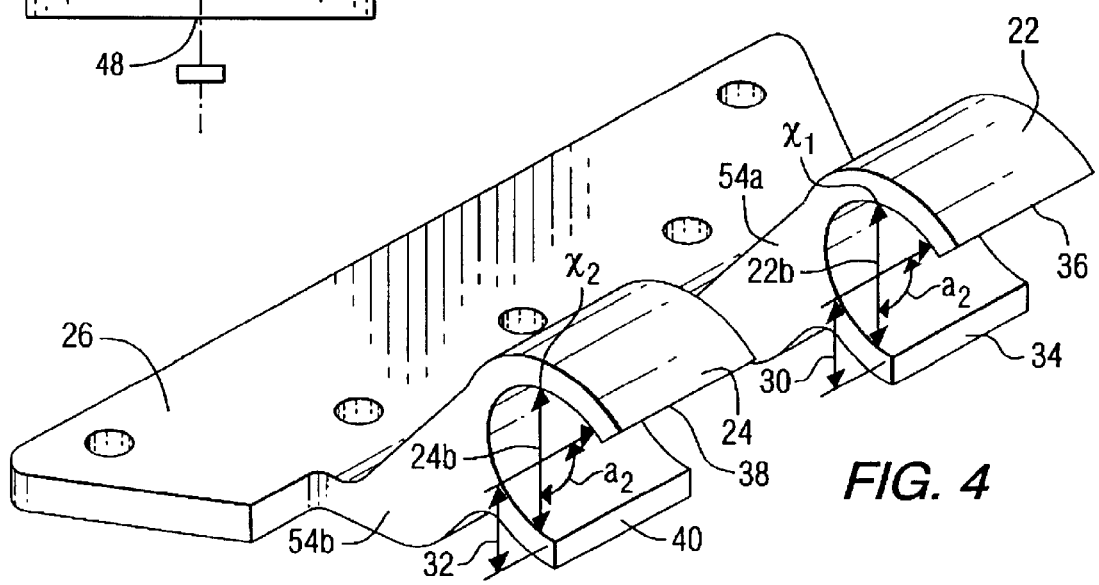
FIG. 4 is a perspective of the flexible clamp that is shown FIG. 1A.

FIGS. 1A, 2 and 3 also show a wheel and axle assembly 42 that is detachably mountable in the brackets 22 and 24 of flexible clamp 20. Wheel and axle assembly 42 includes an axle 44 that has first and second oppositely disposed ends 46 and 48. Wheel and axle assembly 42 also includes first and second wheels 50 and 54 that are rotatably secured to ends 46 and 48 of axle 44 respectively. Wheels 50 and 54 are mounted on axle 44 such that they are free turning on the axle in a manner known to those skilled in the art.

Axle 44 has an outside diameter 57 that is substantially the same as the cross-sectional diameter dimension 22b and 24b of the cylindrical-shaped openings 22a and 24a of brackets 22 and 24 of flexible clamp 20. Furthermore, the diameter of axle 44 is greater than the width of gaps 30 and 32 such that passing axle 44 through gaps 30 and 32 and into cylindrical-shaped openings 22a and 24a of brackets 22 and 24 temporarily biases the end pairs 34, 36 and 38, 40 apart from each other. However, the diameter of axle 44 is not too large so that the biasing of end pairs 34, 36 and 38, 40 exceeds the elastic limit of brackets 22 and 24. When axle 44 is located in cylindrical-shaped openings 22a and 24a, end pairs 34, 36 and 38, 40 return to their unbiased position. In this way, wheel and axle assembly 42 is detachably secured to flexible clamp 20 and golf bag 10. Wheel and axle assembly 42 can be removed from brackets 22 and 24 in the inverse manner by passing axle 44 through gaps 30 and 32 and out of cylindrical-shaped openings 22a and 24a. This again temporarily biases end pairs 34, 36 and 38, 40 apart from each other without exceeding the elastic limits of brackets 22 and 24.

FIGS. 1, 1A and 2–4 also show that gaps 30 and 32 in brackets 22 and 24 respectively are located at respective arc sections of cylindrical openings 22a and 24a. End pairs 34, 36 and 38, 40 define respective angular sectors $a_1$ and $a_2$ of the perimeter of cylindrical openings 22a and 24a of brackets 22 and 24. The top position $x_1$ and $x_2$ of each of the respective cylindrical openings 22a and 24a are defined by the intersection of the perimeter surface of cylindrical openings 22a and 24a, with a diameter bisector of cylindrical openings 22a and 24a taken in a line parallel to the longitudinal center axis 13. End pairs 34, 36 and 38, 40 define respective sectors that are angularly positioned with respect to axis 28 outside of an arc on the perimeter of cylindrical openings 22a and 24a. That arc is preferably at least 20 degrees in either angular direction from the top position $x_1$ and $x_2$ of cylindrical openings 22a and 24a. Most preferably, end pairs 34, 36 and 38, 40 define respective sectors that are angularly positioned with respect to axis 28 outside of an arc that is at least 30 degrees in either angular direction from the top position $x_1$ and $x_2$ of cylindrical openings 22a and 24a. It has been found that, in this way, c-shaped brackets 22 and 24 provide vertical support for axle 44 at times when case 12 is substantially vertically oriented, and also provide vertical support for axle 44 at times when case 12 is manually drawn and is supported by wheel and axle assembly 42.

As also shown in FIGS. 1, 1A and 2–4, c-shaped brackets 22 and 24 are supported from bridge section 26 by riser sections 54a and 54b. Riser sections 54a and 54b elevate and offset the position of c-shaped brackets 22 and 24 with respect to the position of bridge section 26 as measured normal to the longitudinal center axis 13. In this way when wheel axle assembly 42 is removed from flexible clamp 20 and golf bag 10 is in a vertical position and supported on a horizontal surface, c-shaped brackets 22 and 24 do not contact the horizontal support surface for golf bag 10. With the wheel and axle assembly 42 removed from c-shaped brackets 22 and 24 but with flexible clamp 20 still secured to base 18, c-shaped brackets do not interfere with the horizontal support surface. Such interference would tend to cause golf bag 10 to pitch out of a vertical position. This offset of c-shaped brackets 22 and 24 has been found to be advantageous in that when the wheel and axle assembly 42 is detached, the golf bag 10 can be conveniently used in a motorized golf cart. Alternatively, golf bag 10 can be conveniently carried manually and rested on the ground from time-to-time during the course of play.

Wheel and axle assembly 42 further includes a spacer 55 that is concentrically located on axle 44. The outside diameter 56 of spacer 55 is larger than the outside diameter 57 of axle 44 and is also larger than the cross-sectional diameter 22b and 24b of brackets 22 and 24. Spacer 55 is secured to axle 44 by a bonding agent or other means such that spacer 55 is fastened to axle 44. Alternatively, axle 44 can be constructed such that spacer 55 is an integral portion of axle 44. Spacer 55 has a longitudinal dimension 58 that is less than the spacing 60 between brackets 22 and 24 as measured along the longitudinal axis 28. In this way, spacer 55 maintains the wheel and axle assembly 42 in a central position with respect to flexible clamp 20 and golf bag 10.

Figures 5, 7, 8:
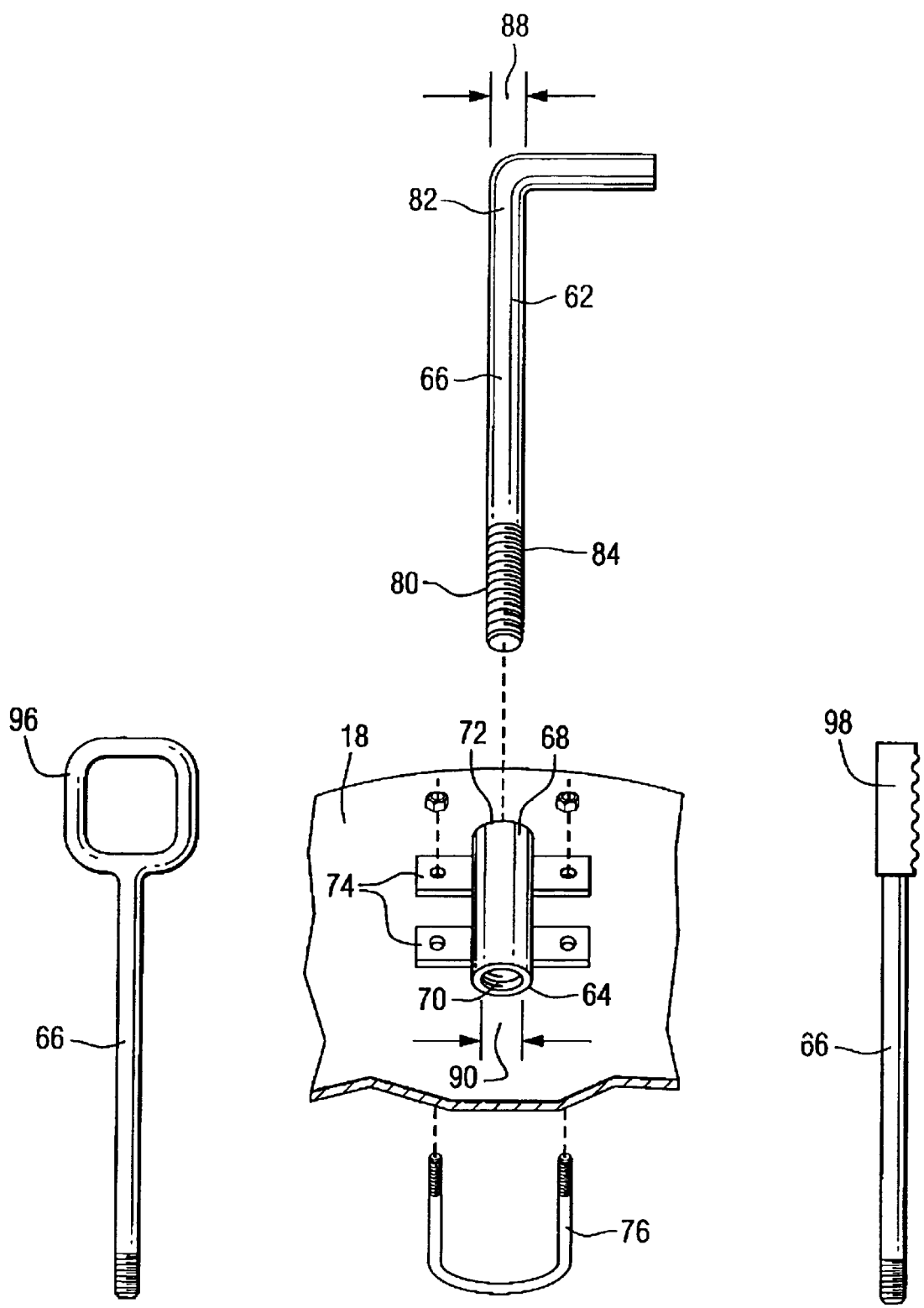
FIG. 5 is an exploded perspective of the handle bracket and handle shaft that are shown in FIG. 1 with the handle bracket shown separately from the handle shaft.
FIG. 7 shows a handle of the type shown in FIG. 5 with an alternative shape for the grip.
FIG. 8 shows a handle of the type shown in FIG. 5 with another alternative shape for the grip.

FIGS. 1 and 5 specifically disclose a handle 62 that is detachably connected to golf bag 10. Handle 62 includes a handle bracket 64 and a shaft 66 that is detachably connected to the bracket 64. Handle bracket 64 includes a cylindrical-shaped member 68 that has internal threads 70 located on at least one end 72 of member 68. Handle bracket 64 further includes at least one extension 74 that is secured to cylindrical-shaped member 68. Extensions 74 are connected to the case 12 of golf bag 10 by fastening means such as U-bolts 76 that fasten around a tubular spine 78 (FIG. 9) that is incorporated in case 12. Alternatively, other equivalent fastening means could also be used depending on the particular construction of case 12. For example, when case 12 includes a wooden or fiberboard plank, extensions 74 can be fastened to case 12 by screws or other fasteners.

Shaft 66 has first and second ends 80 and 82 respectively. As shown in FIG. 5, first end 80 has external threads 84 that are sized for mating engagement with the internal threads of 70 of cylindrical-shaped member 68. Shaft 66 can thus be connected to cylindrical-shaped member 68 of handle bracket 64 by turning shaft 66 into member 68.

Flexible clamp 20 is attached to base 18 such that brackets 22 and 24 are located at first and second angular positions with respect to the longitudinal center axis 13 of case 12. Handle bracket 64 is secured to case 12 at an angular position with respect to longitudinal center axis 13 that is between the first and second angular positions of brackets 22 and 24. In this way, handle bracket 64 is on the same side of golf bag 10 as flexible clamp 20. This location of handle bracket 64 with respect to flexible clamp 20 provides for the orientation of the wheel and axle assembly 42 with respect to the handle 62 such that the golf bag 10 is supported by the wheel and axle assembly 42 at times when the golf bag 10 is pulled by handle 62.

Figure 6:
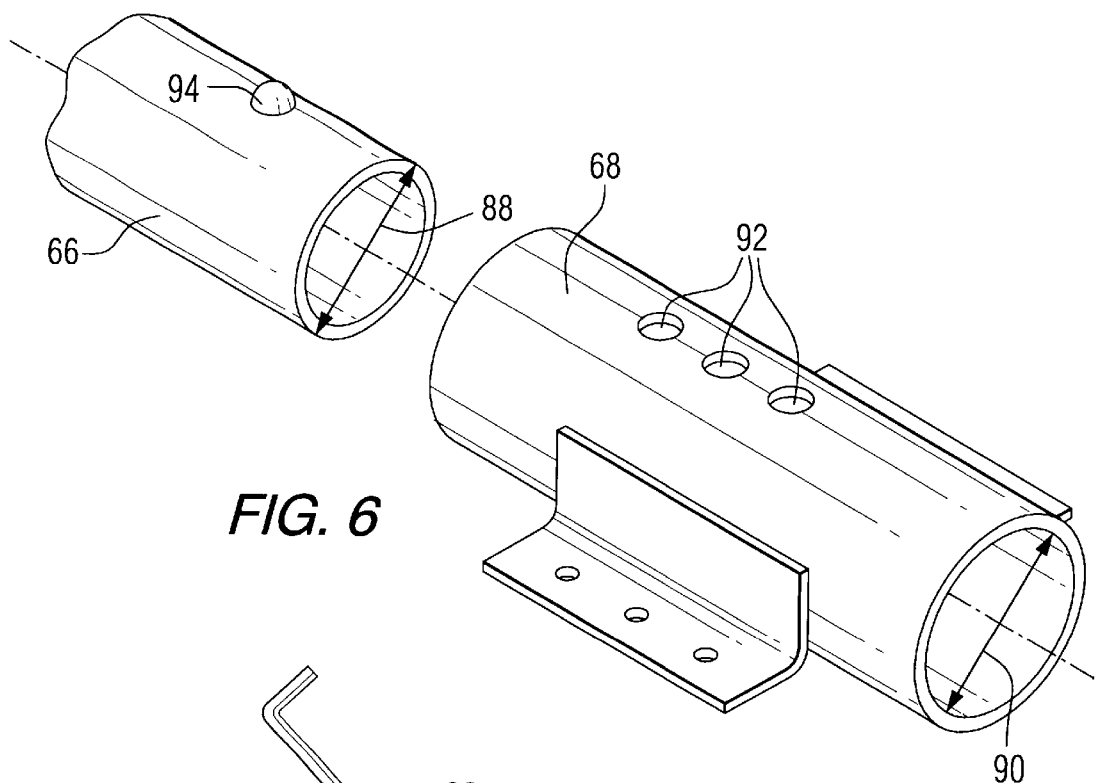
FIG. 6 is a partial view of an alternative embodiment of the handle bracket and the handle shaft showing the detent portion thereof.

Alternatively, shaft 66 and handle bracket 64 can be provided with other connecting means such as the detent 94 that is shown in FIG. 6. In the embodiment of FIG. 6, shaft 66 has an outside diameter 88 that is smaller than the inside diameter 90 of cylindrical-shaped member 68 and cylindrical-shaped member 68 is provided with a linear array of holes 92. A detent 94 is fastened to shaft 66 and mechanically biased in a radial outward direction as known to those skilled in the art. Detent 94 is moved radially inwardly against the bias force by hand pressure. Detent 94 cooperates with a selected hole in the linear array of holes 92 in cylindrical-shaped member 68 to lock shaft 66 together with handle bracket 64.

Alternative to this arrangement of the shaft 66 and cylindrical-shaped member 68, the components could be conversely arranged with the detent located in the cylindrically-shaped member 68 and the holes located in shaft 66. In that embodiment, shaft 66 would be sized to fit concentrically outside cylindrically-shaped member 68.

The second end 82 of shaft 66 can be completed in a convenient grip 96 or 98 such as shown in FIGS. 7 and 8 respectively. In this way, the golf bag 10 can be conveniently pulled by handle 62 while the golf bag 10 is supported on wheel and axle assembly 42.

Figure 9:
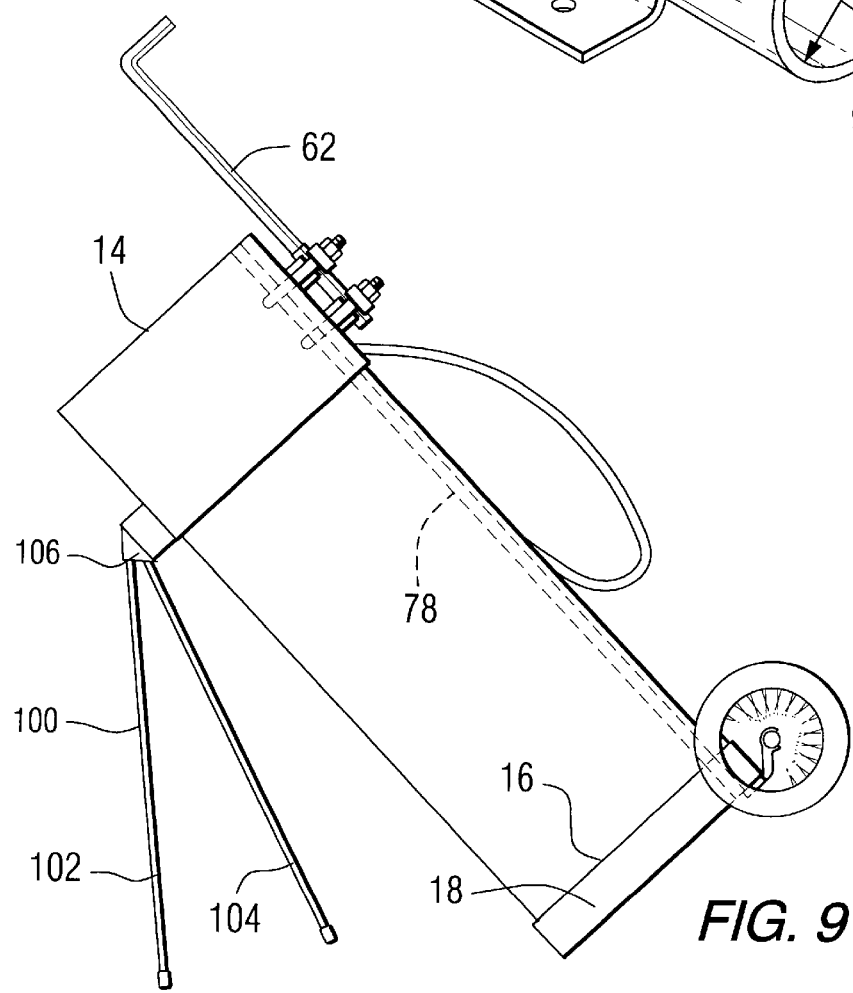
FIG. 9 is a side elevation of the golf bag shown in FIG. 1 with the stand legs extended.

FIGS. 1 and 9 show a stand 100 that is further included in the golf bag 10. Stand 100 includes legs 102 and 104 that are hinged to a base 106. Base 106 is connected to case 12 by fasteners such as screws or rivets that are fastened to case 12 in the manner known to those skilled in the art. The base 106 of stand 100 is located on case 12 at an angular position with respect to longitudinal center axis 13 that is substantially opposite from the angular position of handle bracket 64. In this way, when golf bag 10 is to be located at a stationary position, case 12 is rotated away from the side of wheel and axle assembly 42 so that case 12 rests on stand 100. In this position, golf clubs can be taken from and placed into the open end 14 of case 12 while the golf bag is vertically supported in a stable position.

While a presently preferred embodiment of the invention has been shown and described herein, the presently disclosed invention is not strictly limited thereto but can be otherwise variously embodied within the scope of the following claims.

What is claimed is:

1. A golf bag having removable wheels and also having a removable handle, said golf bag comprising:
    a case that defines first and second oppositely disposed ends, the first end of said case being open to receive golf clubs, said case also having a spine that is located at a given angular position of said case;
    a base that is secured to the second end of said case and that closes the second end of the case, said base being sufficiently strong to provide rigid support for golf clubs when the case is oriented with the open end facing upwardly;
    a flexible clamp that is comprised of a resilient material and that is secured to the base, said flexible clamp being located at substantially the same angular position of said case as said spine, said flexible clamp having at least two c-shaped brackets that are aligned on a common axis, said c-shaped brackets each having substantially the same cross-sectional shape and size with each bracket defining a gap between the ends of the c-shaped bracket, said brackets being joined through a bridge section;
    a wheel and axle assembly that is detachably connectable with the flexible clamp, said wheel and axle assembly having an axle with first and second oppositely disposed ends and also having first and second wheels that are rotatably secured to the first and second ends respectively of the axle, said axle being sized such that the diameter of said axle is larger than the gap defined by the c-shaped brackets such that the c-shaped brackets deform to allow the axle to pass through the gaps that are defined by the respective c-shaped clamps, and also such that the c-shaped clamps return to their non-deformed position after the axle has passed through the gap and the axle is received within the cross-section of the c-shaped brackets and
    a handle bracket that is secured to said case at the same angular position of said case as said flexible clamp, said handle bracket including;
        a cylindrical-shaped member having internal threads at one end thereof; and
        at least one extension that is secured to said cylindrically shaped member, said extension including means for connecting the extension to the case.

2. The golf bag of claim 1 further comprising:
    a shaft that has first and second ends that are oppositely disposed on the shaft, said first end having external threads hat cooperate with the cylindrically-shaped member of the handle bracket and the second end of the shaft being in the form of a grip.

3. The golf bag of claim 1 further comprising:
    a shaft that has first and second ends that are oppositely disposed on the shaft said second end of said shaft comprising a grip and said first end of said shaft being concentrically fitted with one end of the cylindrically-shaped member of the handle bracket, said shaft being locked to the handle bracket by a detent mechanism, that is located in one of said cylindrically-shaped member or said shaft with at least one hole located on the other of said cylindrically-shaped member or said shaft such that the detent extends through the hole to secure the handle to the shaft.

4. A golf bag having removable wheels and also having a removable handle, said golf bag comprising:
    a case that has a longitudinal axis and that defines first and second oppositely disposed ends, the first end of said case being open to receive golf clubs;

a base that is secured to the second end of said case and that closes the second end of the case, said base being sufficiently strong to provide rigid support for golf clubs when the case is oriented with the open end facing upwardly;

a flexible clamp that is comprised of a resilient material and that is secured to the base, said flexible clamp having at least two c-shaped brackets that are aligned on a common axis, said c-shaped brackets each having substantially the same cross-sectional shape and size with each bracket defining a gap between the ends of the c-shaped bracket, said brackets being joined through a bridge section that is secured to said base;

a wheel and axle assembly that is detachably connectable with the flexible clamp, said wheel and axle assembly having an axle with first and second oppositely disposed ends and also having first and second wheels that are rotatably secured to the first and second ends respectively of the axle, said axle being sized such that the diameter of said axle is larger than the gap defined by the c-shaped brackets such that the c-shaped brackets deform to allow the axle to pass through the gaps that are defined by the respective c-shaped clamps, and also such that the c-shaped clamps return to their non-deformed position after the axle has passed through the gap and the axle is received within the cross-section of the c-shaped brackets; and first and second riser sections that are connected to the bridge section, each of said riser sections also being connected to a respective one of said c-shaped brackets, said riser sections offsetting the longitudinal position of the c-shaped brackets from the longitudinal position of the bridge section such that the c-shaped brackets do not interfere with a support surface that is orthogonal to the longitudinal axis of said golf bag at times when the wheel and axle assembly is removed from said c-shaped brackets.

5. The golf bag of claim 4 wherein each of said c-shaped brackets have a cross-sectional shape that defines a cylindrical opening, said cylindrical opening having a top position that is defined by the intersection of the perimeter surface of the cylindrical opening and a diameter bisector of the cylindrical opening that is parallel to the longitudinal axis of said case, said c-shaped bracket having ends that define a sector, said sector being angularly positioned from the top position of the cylindrical opening by at least twenty degrees.

6. The golf bag of claim 4 wherein said wheel and axle assembly further comprises a spacer that is a raised portion of the axle which has a larger outer diameter than the axle and that is located century along the length of the axle.

7. The golf bag of claim 6 wherein the spacer extends longitudinally along the axle by a length that is shorter than the longitudinal separation between the c-shaped brackets of the flexible clamp.

8. The golf bag of claim 4 wherein said case further includes a spine that is at substantially the same angular position of said case as said flexible clamp, said golf bag further comprising:

a handle bracket that is secured to said case at the same angular position of said case as said flexible clamp.

9. The golf bag of claim 8 wherein said handle bracket includes:

a cylindrical-shaped member having internal threads at one end thereof; and at least one extension that is secured to said cylindrically shaped member, said extension including means for connecting the extension to the case.

10. The golf bag of claim 9 further comprising:

a shaft that has first and second ends that are oppositely disposed on the shaft, said first end having external threads that cooperate with the cylindrically-shaped member of the handle bracket and the second end of the shaft being in the form of a grip.

11. The golf bag of claim 10 wherein the second end of said shaft comprises a grip and wherein said first end of said shaft is concentrically fitted with one end of the cylindrically-shaped member of the handle bracket, and wherein said shaft is locked to the handle bracket by a detent mechanism, said detent mechanism being located in one of said cylindrically-shaped member or said shaft and at least one hole being located on the other of said cylindrically-shaped member or said shaft such that the detent extends through the hole to secure the handle to the shaft.

12. The golf bag of claim 8 further comprising a stand that is secured to said case at an angular position on said case that is oppositely disposed from the side of said case to which the handle bracket is secured.

13. The golf bag of claim 12 wherein the stand includes two legs that are pivotally connected to said case.

* * * * *